Sept. 21, 1943.  A. W. HERRINGTON  2,329,901

WHEEL

Filed Jan. 29, 1942

INVENTOR.
BY: ARTHUR W. HERRINGTON,
ATTORNEYS.

Patented Sept. 21, 1943

2,329,901

UNITED STATES PATENT OFFICE 2,329,901

WHEEL

Arthur W. Herrington, Indianapolis, Ind., assignor to Marmon-Herrington Company, Inc., Indianapolis, Ind., a corporation of Indiana Application January 29, 1942, Serial No. 428,659

3 Claims. (Cl. 74—230.5)

This application is a continuation in part of my co-pending application Serial No. 400,232 filed June 28, 1941.

In track laying vehicles the load is applied to the endless track through idler wheels which support the main body of the vehicle and rest upon the inner face of the endless track which comprises inwardly projecting, laterally spaced fingers between which the load-carrying idlers run in order to be held in proper relation with the track laterally of the track.

The specific object of my invention is to provide an improved form of such load-carrying wheels which may be easily produced and which will substantially prolong the effective life of the wheel, track, and vehicle as a whole.

The accompanying drawing illustrates an embodiment of my invention which has been satisfactorily demonstrated in commercial use.

Figure 1:
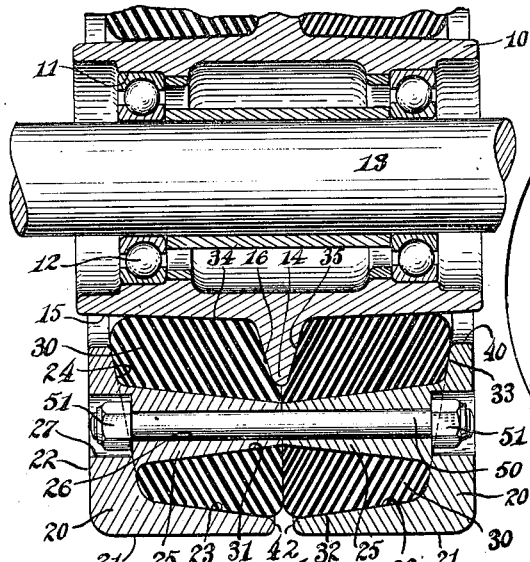
Figure 2:
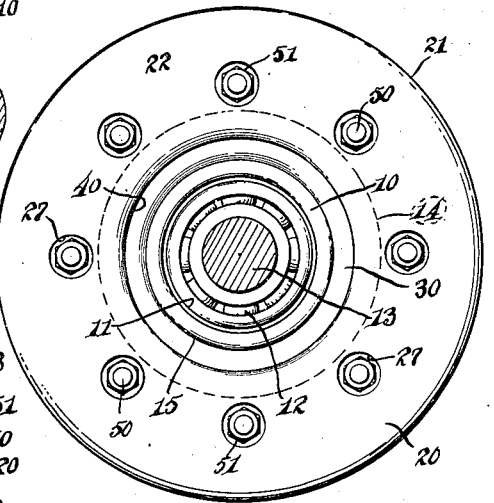
Figure 3:
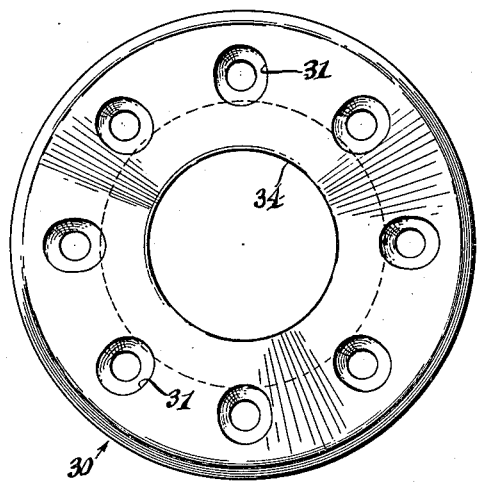

Fig. 1 is a fragmentary radial section of my improved wheel;

Fig. 2 a side elevation on a smaller scale;

Fig. 3 a side elevation on the scale of Fig. 2 of one of the cushion rings; and

Figure 4:
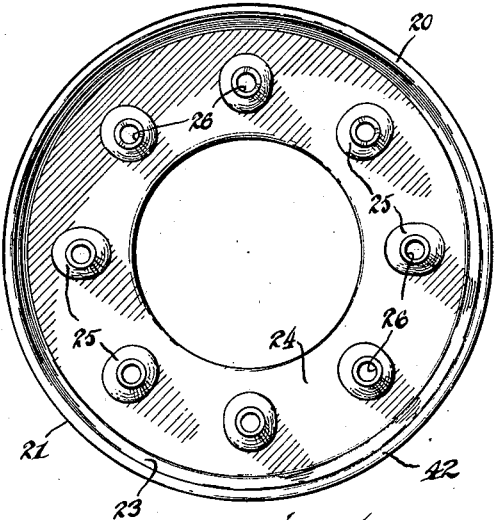

Fig. 4 a side elevation, on the same scale, of one of the wear rings.

In the drawing 10 indicates the main body or hub of my improved wheel having an internal bore 11 for the reception of conventional bearings 12 by means of which it is associated with the axle 13. Main body 10 is provided with an external peripheral ring 14, most conveniently at the middle length of the body 10, thus providing, at each end of said body, a peripheral surface 15 and a nearly radial annular surface 16.

Two identical wear rings 20 are the track-engaging elements. Each of these rings is substantially L-shaped in axial section so as to provide a circumferential wearing surface 21, a radial end surface 22, an internal annular wedging surface 23 which is slightly inclined to the axis of the ring, and a wedging surface 24 which is slightly inclined from a plane normal to the axis of the wheel. Each of these wear rings is provided with a series of circumferentially spaced, inwardly projecting lugs 25 having a bore 26 parallel with the axis of the ring, and a coaxial counterbore 27 inwardly from the surface 22. Each of these lugs 25 is preferably tapered toward its smaller free end and the lengths of these lugs are such that their free ends are brought into contact with each other when the wear rings are clamped together by bolts 50 provided with nuts or heads 51 lying in the counterbores 27.

Nestable within each wear ring 20 and over main body 10 is a cushion ring 30 provided with a series of circumferentially spaced tapered perforations 31 into each of which one of the lugs 25 will closely fit. Externally each cushion ring is provided with surfaces 32, 33, 34, and 35 formed to fit upon surfaces 23, 24, 15, and 16 respectively, of wear ring 20 and main body 10.

The tips 40 of the substantially radial flanges of wear rings 20 are spaced from the circumference of the main body 10 and tips 42 of the substantially axially-extending flanges of wear rings 20 are preferably spaced from each other, when the parts are assembled, although these latter tips may be extended so as to contact when the parts are assembled.

The cushion rings 30 are so proportioned that they may be slipped readily upon and from main body 10 and, when the parts are assembled as shown in Fig. 1, the wedging surfaces 32 and 33 and the lugs 25 of the wear rings 20 put the cushion rings under compression so that the annular surfaces 32, 33, 34 and 35 thereof are pressed with the necessary degree of force upon the contacting surfaces 23, 24, 15, and 16 respectively, the spaces between the main body 10 and tips 40, and between the two tips 42, if these do not contact, provide room for the accompanying distortion of the cushion rings, said rings being formed preferably of rubber or one of its substitutes.

The amount to which the cushion rings are distorted, and the consequent frictional contact between the cushion rings, the main body, and the wear rings, may be readily determined by well known means in accordance with the load to which the structure is to be subjected. The radial height of rib 14 is sufficiently less than the distance between the periphery of the main body of hub 15 and the lugs 25 to permit the desired movement of the wear rings radially of the hub without injuring that portion of the rubber cushions which lies between the tip of the radial rib 14 and the lugs 25.

I am aware that load-carrying wheels for track type vehicles have been provided with exposed rubber tires which have directly contacted the track structures. In such devices the exposed rubber tires are subject to rapid destruction by reason of the abrasion due to contact with the inwardly projecting portions of the track structure and every present track waving. Such destruction is avoided in my present construction and, because of the structure and relative size of my wear rings, it is possible, at reasonable expense, to form these wear rings of metal which may be hardened and accurately formed so that proper coaction of the endless track structure may be had with a very small amount of abrasive wear.

I am also aware that it has heretofore been proposed to provide load-carrying structures which incorporate annular cushion members which have been vulcanized to the metal portions of the wheel, such vulcanization being considered necessary to hold the cushion structure in place. The trouble with such a structure has been not only a high initial cost but also the difficulty of replacement of parts when the cushion has deteriorated to an undesirable extent.

One of the advantages of my present construction is that the cushions may be so sized that they may be readily placed and replaced, yet, after placement, they can be subjected to sufficient distorting stresses to firmly anchor them on the main body and within the wear rings so that they are capable of carrying the requisite load without replacement and without injury by contact with the track structure.

The inner ends of the cushion rings 30 are radial surfaces which abut and these surfaces are pressed tightly together by reason of the distortion of the cushions when bolts 50 are tightened and the inner ends of the lugs 25 brought into contact with each other.

Actual contacting of the inner ends of the lugs 25 when bolts 50 are tightened, while not absolutely essential, is desirable, as such an arrangement protects the bolts 50 against shearing and unifies the two wear rings so that the cushioning effect of each of the annular cushions upon both of the wear rings more evenly distributes the load.

I claim as my invention:

1. A wheel comprising, a main body having a medial external circumferential rib, a pair of mating wear rings each comprising a circumferential flange and an inwardly projecting radial flange surrounding said main body with the edges of their circumferential flanges facing each other, each of said wear rings being provided with a plurality of circumferentially spaced tubular lugs the inner ends of which are abuttable, two rings of rubber interposed between the main body and said wear rings, each of said rings provided with a plurality of circumferentially spaced perforations through which said lugs are projectible, and clamping means passing through said lugs and rings and holding the inner ends of mating lugs in contact with each other, the radial dimensions of said main body being less than the adjacent internal dimensions of the rings.

2. A wheel of the character specified in claim 1, wherein the inner surfaces of the circumferential flanges of the wear rings are coned substantially as described.

3. A wheel of the character specified in claim 1, wherein the main body of the wheel is oppositely coned from its medial rib and the inner surfaces of the circumferential and radial flanges of the wear ring are coned substantially as described.

ARTHUR W. HERRINGTON.